United States Patent
Koubiadis et al.

(10) Patent No.: US 10,345,432 B1
(45) Date of Patent: Jul. 9, 2019

(54) FLEXIBLE WIDEBAND RADAR RECEIVER ARCHITECTURE WITH ENHANCED SENSITIVITY, DYNAMIC RANGE, INSTANTANEOUS BANDWIDTH, AND RANGE WINDOW CAPABILITY

(71) Applicant: Lockheed Martin Corporation, Bethesda, MD (US)

(72) Inventors: Fotis P. Koubiadis, Bordentown, NJ (US); Jude C. Giampaolo, Bensalem, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 586 days.

(21) Appl. No.: 15/083,968

(22) Filed: Mar. 29, 2016

(51) Int. Cl.
*G01S 7/35* (2006.01)

(52) U.S. Cl.
CPC .................... *G01S 7/352* (2013.01)

(58) Field of Classification Search
CPC ...... G01S 7/352; G01S 13/003; G01S 13/767; G01S 7/28; G01S 13/931; G01S 7/36; G01S 13/34; H01Q 21/061; H04B 1/16; H04B 1/0483; H04B 1/0003; A61B 5/0006
USPC ......................................................... 342/195
See application file for complete search history.

(56) References Cited

U.S. PATENT DOCUMENTS

| | | | | |
|---|---|---|---|---|
| 4,158,840 A | * | 6/1979 | Schwab | G01S 13/282 342/123 |
| 5,172,118 A | * | 12/1992 | Peregrim | G01S 7/36 342/191 |
| 5,223,842 A | * | 6/1993 | Okurowski | G01S 7/36 342/173 |
| 5,859,878 A | * | 1/1999 | Phillips | G01S 13/767 375/316 |
| 5,909,193 A | * | 6/1999 | Phillips | H04B 1/16 342/410 |
| 6,343,207 B1 | * | 1/2002 | Hessel | H04B 1/0003 455/552.1 |
| 6,614,386 B1 | * | 9/2003 | Moore | G01S 13/003 342/160 |
| 7,038,618 B2 | * | 5/2006 | Budic | G01S 7/414 342/159 |
| 7,369,083 B2 | | 5/2008 | Budic | |
| 7,573,398 B2 | * | 8/2009 | Hoctor | A61B 5/0006 340/870.06 |
| 7,773,028 B2 | * | 8/2010 | Chan | G01S 7/282 342/118 |
| 7,858,910 B2 | * | 12/2010 | Williams | G01S 17/895 244/3.1 |
| 9,059,816 B1 | * | 6/2015 | Simpson | H04L 1/0001 |

(Continued)

FOREIGN PATENT DOCUMENTS

| | | | | |
|---|---|---|---|---|
| WO | WO-2004082197 A2 | * | 9/2004 | ........... H04B 1/0483 |
| WO | WO-2008001092 A2 | * | 1/2008 | ......... G01S 13/0209 |

*Primary Examiner* — Vladimir Magloire
*Assistant Examiner* — Nuzhat Pervin
(74) *Attorney, Agent, or Firm* — Oblon, McClelland, Maier & Neustadt, L.L.P.

(57) ABSTRACT

A signal processing system including a plurality of receivers configured to receive a return signal from a transmitted radio frequency (RF) waveform. A mode control processor is configured to selectively and independently alter at least one characteristic of a signal down conversion process performed by each receiver. A digital signal processor is configured to integrate the outputs of the plurality of receivers.

18 Claims, 9 Drawing Sheets

(56) References Cited

U.S. PATENT DOCUMENTS

| | | | | |
|---|---|---|---|---|
| 9,176,223 B2* | 11/2015 | Derham | ............... | G01S 7/36 |
| 9,680,576 B1* | 6/2017 | Middleton | ............ | H04B 10/40 |
| 9,829,567 B1* | 11/2017 | Davis | ................ | G01S 13/931 |
| 2002/0154054 A1* | 10/2002 | Small | ................ | G01S 7/28 |
| | | | | 342/201 |
| 2006/0063490 A1* | 3/2006 | Bader | ................ | H04B 1/0483 |
| | | | | 455/45 |
| 2007/0002961 A1* | 1/2007 | Hoctor | ............... | A61B 5/0006 |
| | | | | 375/267 |
| 2010/0328157 A1* | 12/2010 | Culkin | ............... | H01Q 21/061 |
| | | | | 342/372 |
| 2011/0183625 A1* | 7/2011 | Pillai | ................ | G01S 7/282 |
| | | | | 455/67.11 |
| 2012/0252387 A1* | 10/2012 | Haskins | ............. | H04B 1/0014 |
| | | | | 455/131 |
| 2013/0156134 A1* | 6/2013 | Galan | ................ | H04B 1/0007 |
| | | | | 375/340 |
| 2014/0253368 A1* | 9/2014 | Holder | ............... | G01S 13/003 |
| | | | | 342/146 |
| 2015/0139370 A1* | 5/2015 | Haban | ................ | H04B 7/0837 |
| | | | | 375/347 |
| 2015/0288467 A1* | 10/2015 | Kahrizi | ............... | H04B 17/21 |
| | | | | 370/241 |
| 2016/0109559 A1* | 4/2016 | Delbecq | ............. | G01S 13/34 |
| | | | | 342/170 |

* cited by examiner

FLEXIBLE WIDEBAND RADAR RECEIVER ARCHITECTURE WITH ENHANCED SENSITIVITY, DYNAMIC RANGE, INSTANTANEOUS BANDWIDTH, AND RANGE WINDOW CAPABILITY

FIELD OF THE INVENTION

The present invention relates to signal processing systems and methods, and more particularly, to a reconfigurable radar system and method of operation thereof.

BACKGROUND

Signal processing systems, such as radar and sonar systems, are useful for detecting, characterizing and monitoring various kinematic parameters associated with natural and/or man-made objects, and are important for both civilian and military operations. In radar systems, for example, one or more transmitted electromagnetic (EM) signals, referred to herein as radio frequency (RF) waveforms or pulses, are intended to engage one or more objects or targets. Reflected return signals (or echoes) are received and processed for object identification and characterization. Several types of transmitted signals may be used. For example, single pulse, multiple pulse, and linear frequency modulated (LFM) waveforms may be used, with each waveform type having particular advantages in terms of target detection and velocity and acceleration estimation, by way of example only.

Current signal processing systems have difficulty simultaneously providing high dynamic range, large instantaneous bandwidth, large wideband range window coverage, and high sensitivity in a cost effective manner. More specifically, in the context of radar applications, systems are designed to support either high dynamic range or high sensitivity. Moreover, these systems are limited by their receiver bandwidth. Traditional mitigation approaches are inefficient, requiring multiple pulse repetition intervals (PRIs) to mitigate, including time consumption. For example, multiple PRI frequency waveforms may be employed for large wideband coverage. Moreover, in multiple PRI stretch processing approaches each range window limits a range coverage region according to a ratio of the receiver's intermediate frequency (IF) bandwidth and a desired or target wideband waveform bandwidth.

Improved systems and methods for providing high dynamic range, large instantaneous bandwidth, large wideband range coverage, and high sensitivity in a single system are desired.

SUMMARY

In one embodiment of the present disclosure, a signal processing system, is provided. The system includes a plurality of receivers configured to receive a return signal from a transmitted radio frequency (RF) waveform. A mode control processor is also provided and configured to selectively alter at least one characteristic of a signal down conversion process performed by each receiver. A digital signal processor is used to integrate the outputs of the plurality of receivers.

A system according to another embodiment of the present disclosure includes a plurality of receivers configured to receive a return signal from a transmitted radio frequency (RF) waveform. One or more computer processors is operative to, in response to a first control signal, configure a first one of the plurality of receivers for combining the received return signal with a waveform of a first frequency at a first time, and to configure a second one of the plurality of receivers for combining the received return signal with a waveform of a second frequency at the first time. In response to a second control signal, the one or more computer processors is further operative to configure a third receiver of the plurality of receivers for combining the received return signal at a third time with a waveform, and to configure a fourth receiver of the plurality of receiver for combining the received return signal with a waveform of the same frequency of that used by the third receiver and at a time distinct from that of the third receiver.

According to another embodiment of the present disclosure, a method of processing received signals in a radar system is provided. The method includes the steps of receiving a return signal via at least one antenna element, and processing the received return signal with a first subset of a plurality receivers, wherein each receiver of the first subset combines the return signal at a first time with a local oscillator signal whose frequency is distinct from local oscillator signals utilized by the remainder of the first subset. A second subset of the plurality of receivers are used to process the received return signal, wherein each receiver of the second subset combines the return signal with a local oscillator signal of the same frequency at a time distinct from the remainder of the second subset.

DETAILED DESCRIPTION

Figure 1:
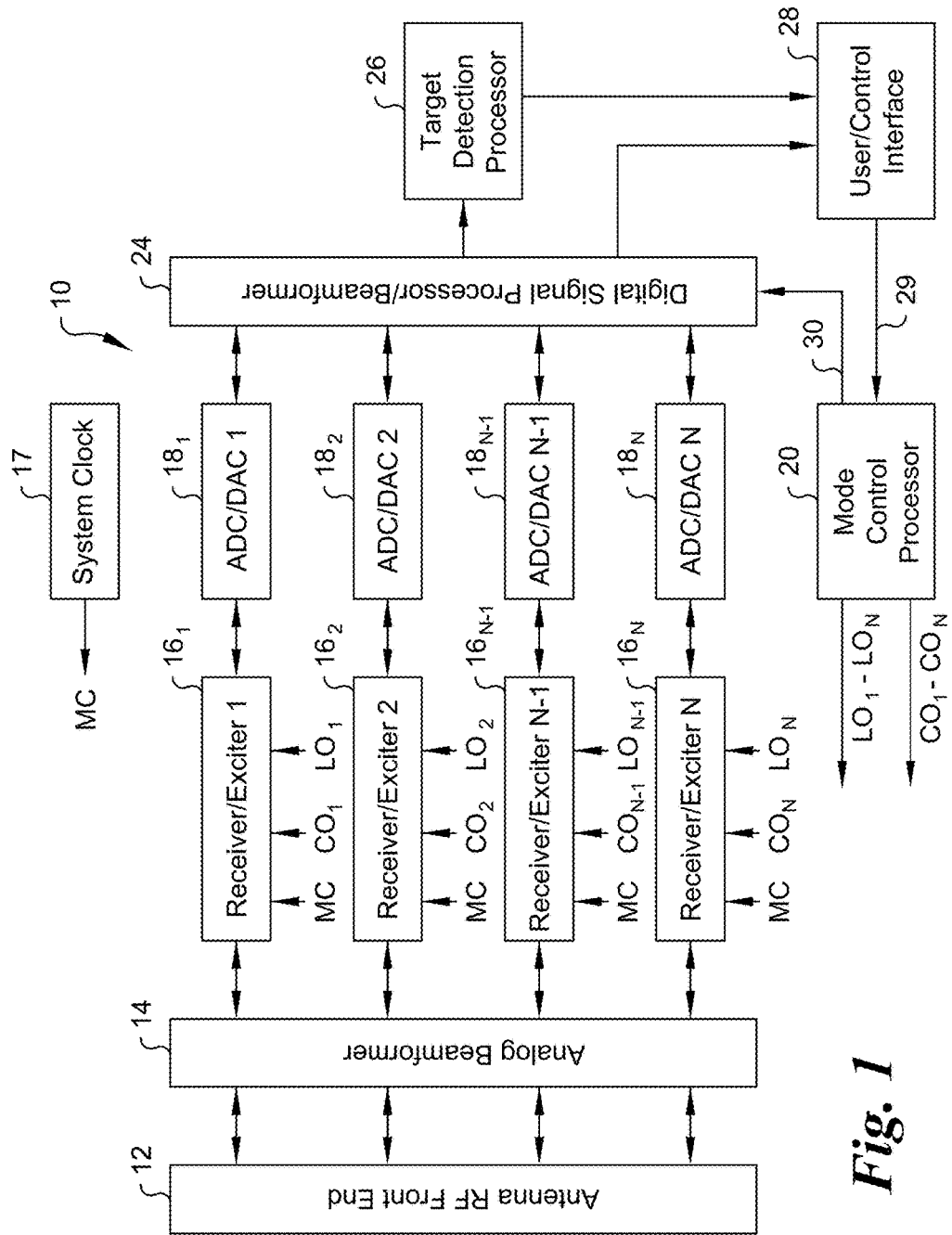
FIG. 1 is a simplified schematic diagram of a radar system according to an embodiment of the present disclosure.

It is to be understood that the figures and descriptions of the present invention have been simplified to illustrate elements that are relevant for a clear understanding of the present invention, while eliminating, for purposes of clarity, many other elements found in signal processing systems, including radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include a reconfigurable signal processing system (e.g. a radar system) architecture that extends traditional signal processing limitations comprehensively, in a cost-effective and efficient manner. Embodiments provide a system capable of real-time reconfigurability to selectively maximize sensitivity, dynamic range, target range coverage, and instantaneous bandwidth capability within a single PRI, and a system which is adaptable from PRI to PRI.

More specifically, embodiments of the present disclosure include a radar system comprising a plurality (N) of receivers arranged in parallel and responsive to an input signal received from one or more antenna elements. Embodiments of the present disclosure process the received signal with PRI-to-PRI tunable receiver and downstream processing control parameters to adapt real-time performance of the system based on a desired performance enhancement characteristic.

For example, systems according to embodiments of the present disclosure may be configured to extend a stretch processing range window achievable (up to a factor of N) thereby collecting high range resolution target signature returns for extended targets or multiple targets all within a single PRI. This first mode of operation may be accomplished by integrating N independent receiver outputs, wherein at least two of the N receivers operate with different time offsets and perform down conversion operations with a common carrier or local oscillator signal frequency.

Systems according to embodiments of the present disclosure may also be configured to provide high range resolution capability by increasing instantaneous waveform bandwidth up to a factor of N, all within a single PRI. This second mode of operation may be accomplished by coherently integrating signals output from each receiver, wherein the receivers process return signals with a common time offset (i.e. process return signals simultaneously), and wherein at least two of the N receivers utilize distinct local oscillator signal frequencies in their down conversion processes.

Systems according to embodiments of the present disclosure may also be operated in a third or mixed mode of operation, wherein a first portion or subset of the N receivers are operated in the above-described first mode, and a second portion or subset of the N receivers are operated in the above-described second mode.

Systems according to embodiments of the present disclosure provide high SNR capability by virtue of their coherent, parallel integration of received signals across multiple receivers. In this way, SNR performance is only limited by front-end noise contributors, rather than by a gain reduction that would otherwise result from splitting a received signal to feed multiple receivers in instances when the time offset and carrier frequency parameters are common across more than a single receiver. Embodiments further improve dynamic range performance in the presence of large interferences for each PRI, regardless of the time offset or carrier frequency parameter utilized for each receiver. This is inherently accomplished by reducing the gain to each receiver by a factor of N.

Referring generally to FIG. 1, embodiments of the present disclosure will be described herein as implemented into an exemplary radar system 10. Radar system 10 comprises an antenna front end 12 including a plurality of RF antenna elements and amplifiers for transmitting and/or receiving RF signals. In the exemplary system 10, receivers and exciters are embodied as a plurality of N integrated receiver/exciter elements $16_{1-N}$ arranged in parallel with one another. In other embodiments, separate exciters and receivers may be provided without departing from the scope of the present disclosure. As will be understood by one of ordinary skill in the art, exciters $16_{1-N}$ are responsive to input signals received from a digital signal processor 24 or waveform generator via a plurality of digital-to-analog converters (DACs) $18_{1-N}$ for generating RE signals to be provided to antenna front end 12. An optional analog beamformer 14 comprising a plurality of combiners and splitters may be provided for distributing the desired RF waveforms to the antenna front end 12 (on transmit) and distributing the returned RF signal to receivers $16_{1-N}$ (on receive). In other embodiments, analog beamformer 14 may be replaced by a fully-digital arrangement, wherein digital signal processor or beamformer 24 provides all the beamforming functions.

Waveforms transmitted by antenna front end 12 are reflected off of one or more targets, generating return signals or echoes. Return signals are captured by antenna front end 12 and communicated to receivers $16_{1-N}$ for analog signal processing, including down conversion operations. Receivers $16_{1-N}$ may include various processing components, such as one or more filters, low-noise amplifiers and down converters, as will be understood by one of ordinary skill in the art.

The outputs of receivers $16_{1-N}$ are provided to respective analog-to-digital converters (ADCs) $18_{1-N}$ for converting received analog return signals to digital form for further processing by digital signal processor 24. Digital signal processor 24 may include, for example, pulse compression module(s) (not shown) operative to receive post-ND digitized in-phase and quadrature-phase (I/Q) signal data from the output of ADCs $18_{1-N}$. As will be understood by one of ordinary skill in the art, pulse compression techniques may be implemented to achieve high range resolution without the need for high-powered antennas. Pulse compression may be accomplished by various filtering and/or line delay arrangements. By way of background, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

An output or outputs of digital signal processor 24 may be provided to, by way of non-limiting example, a detection processor 26 for performing target detection operations. Exemplary target detection processing may be performed against a time-averaged background map. These detection processes may include one or more of "greatest of" operations, as well as perform constant false alarm rate (CFAR) detection techniques. The results of this detection processing may be provided to a display device (not shown) for end-user interfacing.

Referring again to receivers $16_{1-N}$, in one exemplary embodiment, each receiver $16_{1-N}$ includes one or more electronic or local oscillators (LOs) for generating signals of a desired frequency used in the down conversion or heterodyning operations performed thereby. In other embodiments of the present disclosure, external LOs may be implemented, with their outputs selectively provided to a respective one of receivers $16_{1-N}$ for performing frequency mixing operations. System 10 further includes, by way of example only, a system clock 17. Receivers $16_{1-N}$ are responsive to a master clock reference MC generated by system clock 17 for controlling the timing of the signal modulation operations performed thereby.

In addition to master clock reference MC, receivers $16_{1-N}$ are responsive to respective LO control messages or signals $LO_{1-N}$, and clock offset control messages or signals $CO_{1-N}$. More specifically, control signals $LO_{1-N}$ are indicative of a desired LO signal or signal frequency to be utilized by each receiver $16_{1-N}$ in down conversion processing. Likewise, control signals $CO_{1-N}$ are indicative of, for example, a time offset with respect to master clock reference MC to be utilized by each receiver $16_{1-N}$. Control signals $CO_{1-N}$ are operative to cause, for example, receivers $16_{1-N}$ to delay down conversion processing by a predetermined time.

A mode control processor 20 is provided and configured to generate and selectively output control signals $CO_{1-N}$ and control signals $LO_{1-N}$ to receivers $16_{1-N}$ in order to achieve a desired performance characteristic of system 10. Regarding the operational timing of receivers $16_{1-N}$, in one embodiment, this may include providing at least a first portion or subset of receivers $16_{1-N}$ and a second portion or subset of receivers $16_{1-N}$ with control signals $CO_{1-N}$ of differing values, such that the first and second portions of receivers $16_{1-N}$ operate in an asynchronous manner. In other embodiments, mode control processor 20 is configured to provide each receiver $16_{1-N}$ with a control signal $CO_{1-N}$ of the same value (or no clock offset signal at all), such that all receivers $16_{1-N}$ are synchronized in operation. In still other embodiments, each receiver of a first portion of receivers $16_{1-N}$ (e.g. receivers $16_{1-N/2}$) may be provided with a respective distinct control signal $CO_{1-N/2}$, while each receiver of a second portion of receivers $16_{1-N}$ (e.g. receivers $16_{(N/2+1)-N}$) are provided with control signals $CO_{(N/2+1)-N}$ of the same value.

Regarding local oscillator control, mode control processor 20 may be configured to provide each receiver $16_{1-N}$ with a respective control signal $LO_{1-N}$ indicative of the same LO frequency or waveform. In other embodiments, each receiver $16_{1-N}$ may be provided with a respective distinct control signal $LO_{1-N}$ indicative of a different LO frequency or waveform. In still other embodiments, a first portion of receivers $16_{1-N}$ may be provided with distinct control signals $LO_{1-N}$, while a second portion of receivers $16_{1-N}$ may be provided with the same control signal $LO_{1N}$. As set forth above, embodiments are generally described herein as using control signals to instruct or configure a given receiver to utilize a desired internally-generated LO frequency. However, in the case of a system comprising oscillators external to the receivers, it should be understood that mode control processor 20 may be operative to selectively provide outputs of desired or target oscillators to the receivers for achieving similar functions to those set forth above.

Mode control processor 20 may be embodied as one or more processors in communication with one or more memory devices (not shown) containing suitable instructions, and/or a user or control interface for performing the operations set forth herein. Mode control processor 20 may be responsive to a user interface or control interface 28, for example, a computer executing control algorithms that generate real time, dynamic command instructions 29 derived from available 1) real time target return data (e.g. target characteristics derived from prior PRIs) in the target detection processor 26 or digital signal processor 24 and/or 2) operator provided radar mission data entered into the computer through an input device (e.g., a keyboard). These instructions may include the identification or selection of a desired mode of operation, or the selection of specific parameters to be used by the system (e.g. desired control signals CO and/or LO values to be provided to each receiver). Mode control processor 20 may also be operative to output instructions 30 to digital signal processor 24, or other downstream processing devices, for commanding suitable back end signal processing for a given mode of operation of system 10.

Figure 2A:
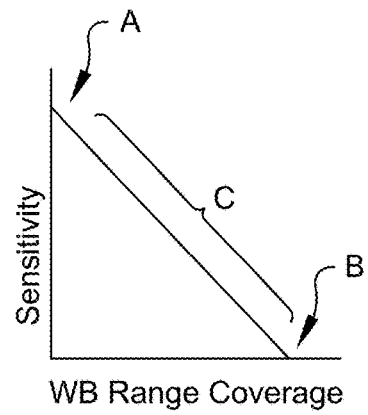
FIGS. 2A, 2B, 3A and 3B are simplified graphical illustrations representing various modes of operation of a radar system according to embodiments of the present disclosure.
Figure 2B:
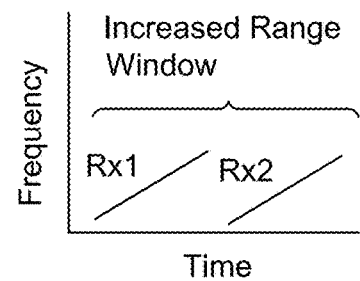

Exemplary modes of operation achievable by embodiments of the present disclosure will be described in the context of exemplary radar system 10. FIG. 2A generally illustrates a comparison of sensitivity and wideband stretch processing range coverage parameters between modes of operation achievable by a system according to embodiments of the present disclosure. A first or maximum system sensitivity mode for a given bandwidth is indicated at point A and is achieved by providing each receiver $16_{1-N}$ with a common clock offset signal $CO_{1-N}$ and a common LO frequency, or a control signal $LO_{1-N}$ indicating the same from mode control processor 20. The maximum sensitivity is achieved by coherently integrating across ADC 18$_{1-N}$ outputs in the digital signal processor 24 (e.g. in response to instructions 30). A second or maximum range window mode of operation is indicated at a point B. The maximum range mode is achieved by: 1) operating each receiver 16$_{1-N}$ with a common LO frequency by, for example, providing common valued control signals LO$_{1-N}$ to each receiver; and 2) operating each receiver 16$_{1-N}$ at distinct times by, for example, providing distinctly valued control signals CO$_{1-N}$ to each receiver 16$_{1-N}$. See also FIG. 2B illustrating the same. The individual pulse compressed responses generated from each receiver's output are then integrated or concatenated together into a single extended range window response in the digital signal processor 24 (e.g. in response to instructions 30). Range C represents a mixed mode of operation, wherein a first portion of receivers 16$_{1-N}$ are operated according to the maximum sensitivity mode A, and a second portion of receivers 16$_{1-N}$ are operated according to the maximum range mode B.

Figure 3A:
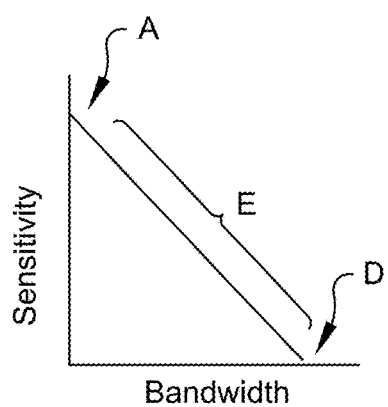
Figure 3B:
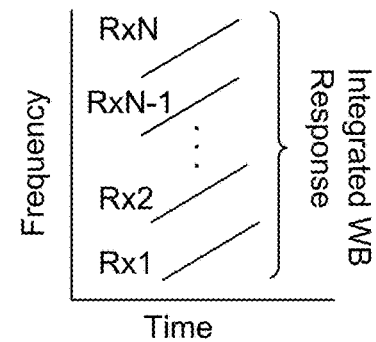

FIG. 3A generally illustrates a comparison of sensitivity and instantaneous bandwidth parameters between two modes of operation, specifically, the first maximum sensitivity mode, and a third maximum bandwidth mode. As set forth with respect to FIG. 2A, point A is indicative of the maximum system sensitivity achieved by operating each receiver 16$_{1-N}$ simultaneously and with the same LO frequency. The maximum sensitivity is achieved by coherently integrating across ADC 18$_{1-N}$ outputs in the Digital Signal Processor 24. Alternatively, the system may be operated in a maximum instantaneous bandwidth response mode, indicated at point D, wherein each receiver 16$_{1-N}$ is operated contemporaneously with a different LO frequency by, for example, providing each receiver 16$_{1-N}$ with a common value control signal CO$_{1-N}$ and a distinctly valued control signal LO$_{1-N}$, wherein the outputs of receivers 16$_{1-N}$ are subsequently coherently integrated in digital signal processor 24 (e.g. after pulse compression of each individual receiver output) to generate a composite higher range resolution signal response. See also FIG. 3B. An intermediate range E represents a mixed mode operation, wherein a first portion of receivers 16$_{1-N}$ are operated according mode A, and a second portion of receivers 16$_{1-N}$ are operated according to mode D.

Figure 4:
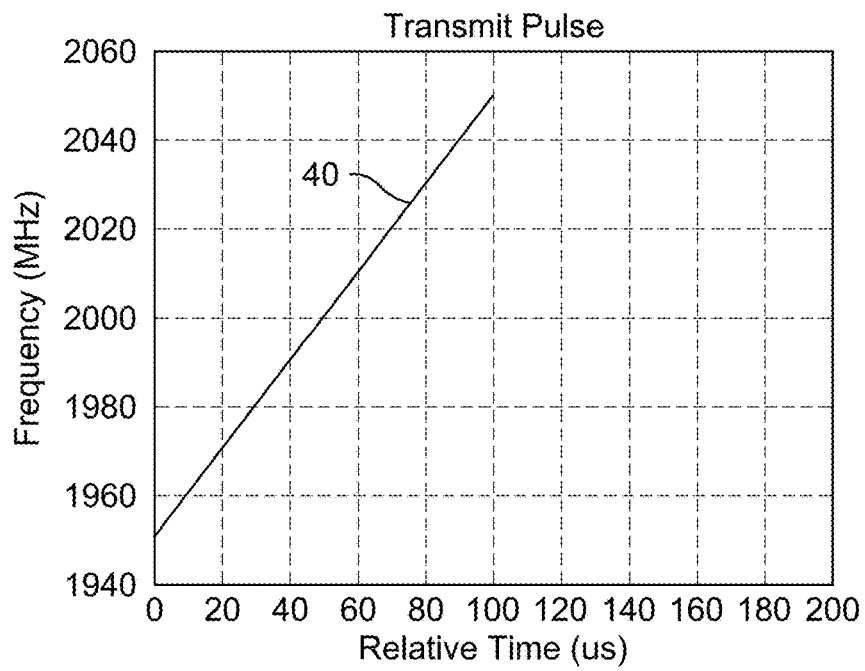
FIG. 4 is a graphical illustration of an exemplary transmitted waveform useful for describing an enhanced range window mode of operation according to an embodiment of the present disclosure.
Figure 5:
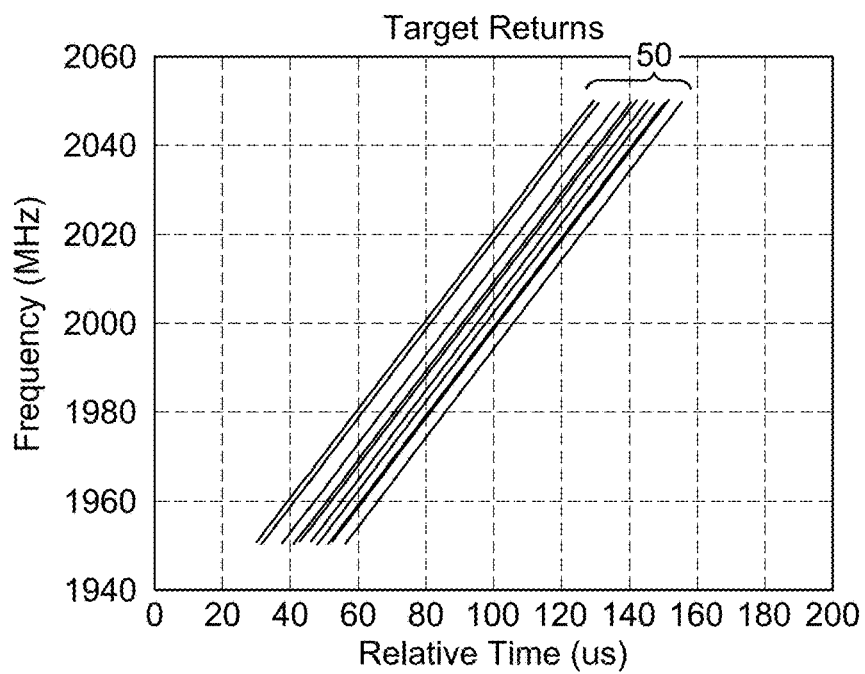
FIG. 5 is a graphical illustration of exemplary target return signals originating from the transmitted waveform of FIG. 4, useful for describing the enhanced range window mode of operation according to an embodiment of the present disclosure.

A more detailed explanation of an enhanced wideband stretch processing range window mode of operation will be described in the context of a transmitted waveform having a center frequency $f_C$ equal to 2 GHz, an RF bandwidth $B_{RF}$ equal to 100 MHz, and a pulse duration T equal 100 microseconds (us), and an exemplary radar system having a receiver utilizing an IF bandwidth $B_{IF}$ equal to 10 MHz. See FIG. 4, illustrating an exemplary transmitted waveform 40, and FIG. 5, illustrating exemplary target return signals 50 originating therefrom.

As will be understood by one of ordinary skill in the art, a maximum achievable range window R using traditional stretch processing methods is dictated by the following expression:

$$R = \frac{CT}{2} \cdot \frac{B_{IF}}{B_{RF}} \qquad \text{Eq. 1}$$

wherein c is the speed of light. Given the exemplary system parameters, a maximum range window, for example, for one or more receivers operating with the same time offset (i.e. operating contemporaneously) is given by:

$$R = \frac{\left(3 \times 10^8 \frac{m}{s}\right)(100 \times 10^{-6} s)}{2} \cdot \frac{10 \times 10^6 \text{ Hz}}{100 \times 10^6 \text{ Hz}} = 1500 \text{ m} = 1.5 \text{ km}$$

In an exemplary increased range window mode of operation, and referring again to FIG. 1, a first portion of receivers 16$_{1-N}$ (e.g. receivers 16$_{1-N/2}$) may be provided with respective control signals CO$_{1-N/2}$ of equal value (e.g. indicative of a clock offset of zero), and a second portion of receivers 16$_{1-N}$ (e.g. receivers 16$_{(N/2+1)-N}$) may be provided with respective control signals CO$_{(N/2+1)-N}$ of distinct value from control signals CO$_{1-N/2}$ provided to the first portion of receivers 16$_{1-N/2}$. For the purpose of illustration only, assuming that a range window of 3.0 km is desired, or twice that achievable by one or more receivers utilizing the same clock offset or clock reference. A required clock or time offset $\Delta t_{LO}$ to be provided to the second portion of receivers 16$_{(N/2+1)-N}$ relative to the first portion of receivers 16$_{1-N/2}$ in order to achieve a window offset $\Delta r$ equal to 1.5 km is dictated by:

$$\Delta t_{LO} = \frac{2\Delta r}{c} \qquad \text{Eq. 2}$$

Figure 6:
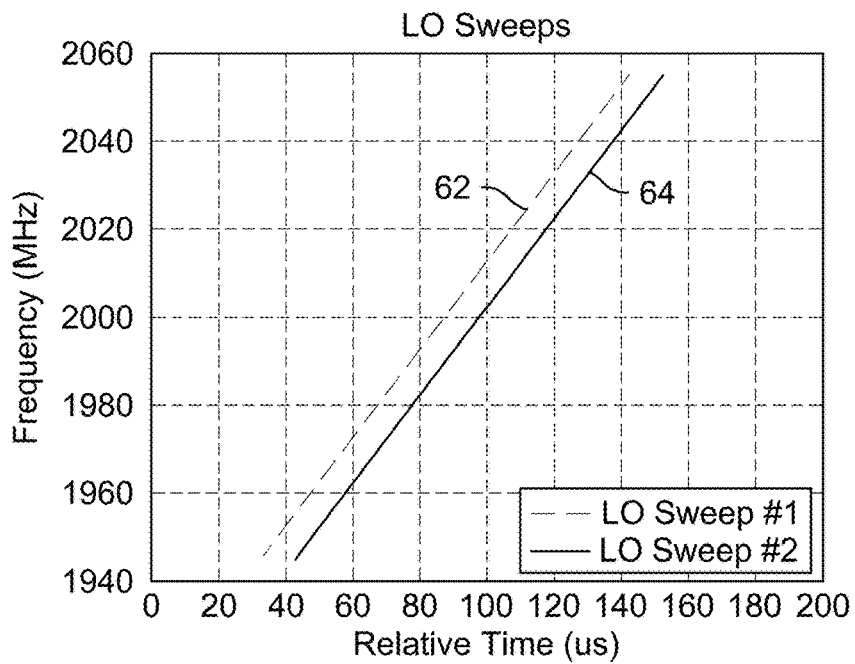
FIG. 6 is a graphical illustration of two exemplary local oscillator waveforms utilized by two corresponding receivers for performing the enhanced range window mode of operation according to an embodiment of the present disclosure.
Figure 7:
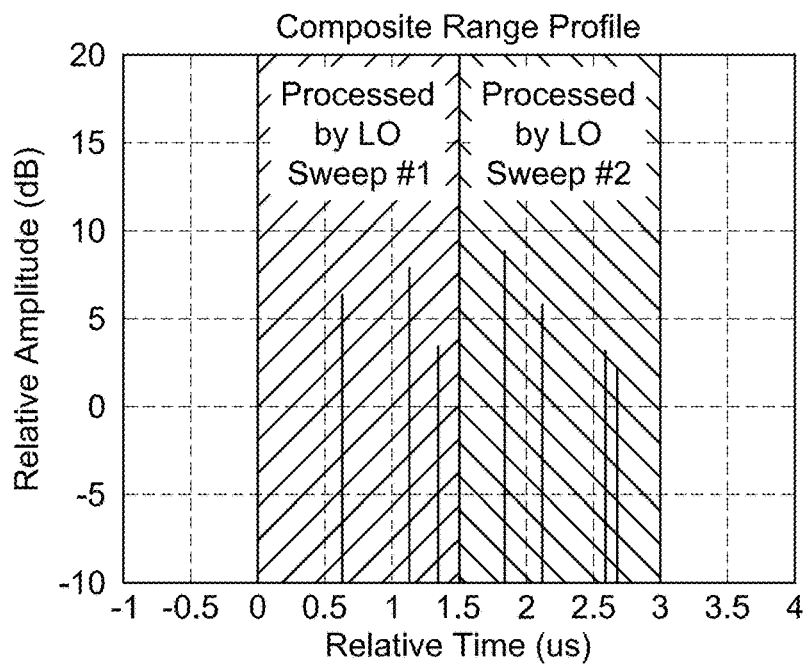
FIG. 7 is a graphical illustration of a composite response illustrating the enhanced range window coverage achieved by the embodiments of the present disclosure.

FIG. 6 illustrates two exemplary LO waveforms used in the down conversion processing of respective first and second portions of receivers 16$_{1-N}$. A first LO waveform 62 corresponds to receivers 16$_{1-N/2}$ utilizing the first clock offset, and a second LO waveform 64 corresponding to receivers 16$_{(N/2+1)-N}$ utilizing the second, distinct clock offset. Targets identified by respective receivers 16$_{1-N/2}$ corresponding to LO waveform 62 and receivers 16$_{(N/2+1)-N}$ corresponding to LO waveform 64 are shown in FIG. 7. Note, the expansion of available range for target detection from what would otherwise be achievable by operating each receiver 16$_{1-N}$ with single or like-valued clock offset.

Figure 8:
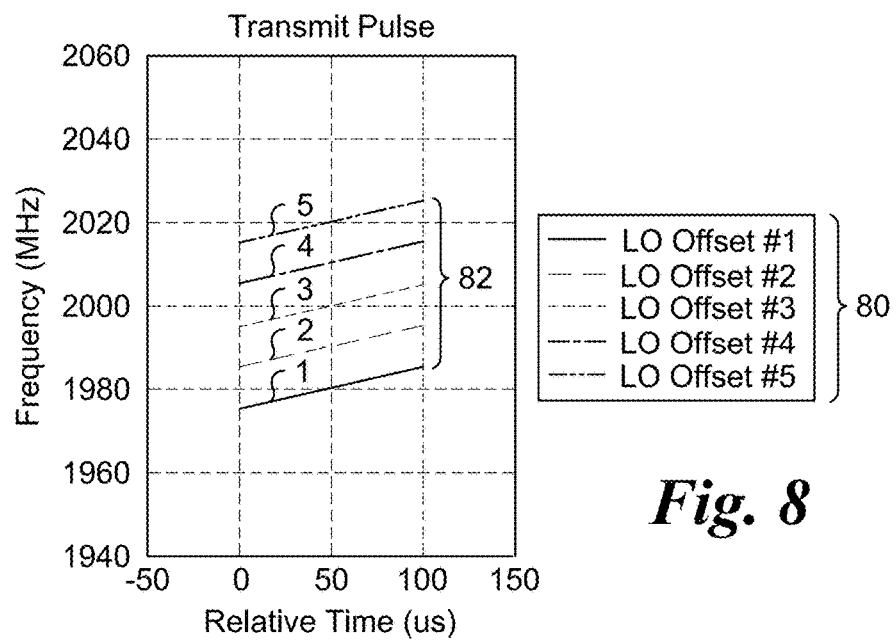
FIG. 8 is a graphical illustration of exemplary transmitted waveforms useful for describing an enhanced instantaneous wideband frequency response mode of operation according to an embodiment of the present disclosure.
Figure 9:
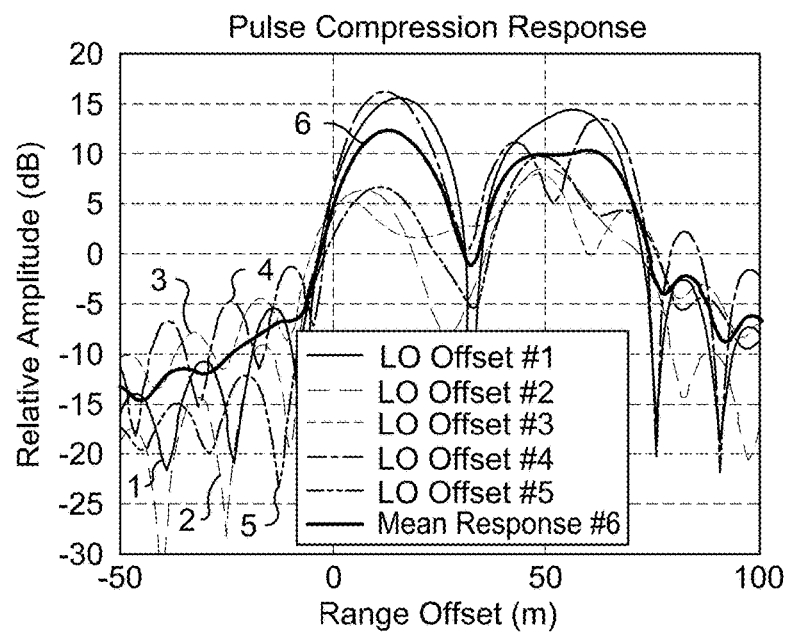
FIG. 9 is a graphical illustration of exemplary pulse compression responses of respective received return signals originating from the transmitted waveforms of FIG. 8, as well as a mean pulse compression response.
Figure 10:
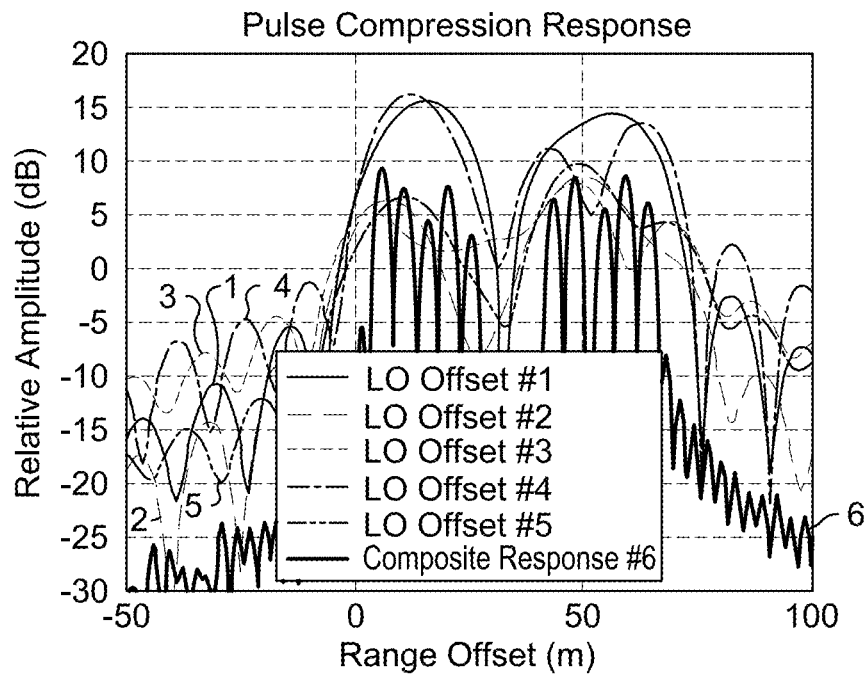
FIG. 10 is a graphical illustration of exemplary pulse compression responses of respective received return signals originating from the transmitted waveforms of FIG. 8, as well as a composite pulse compression response.
Figure 11:
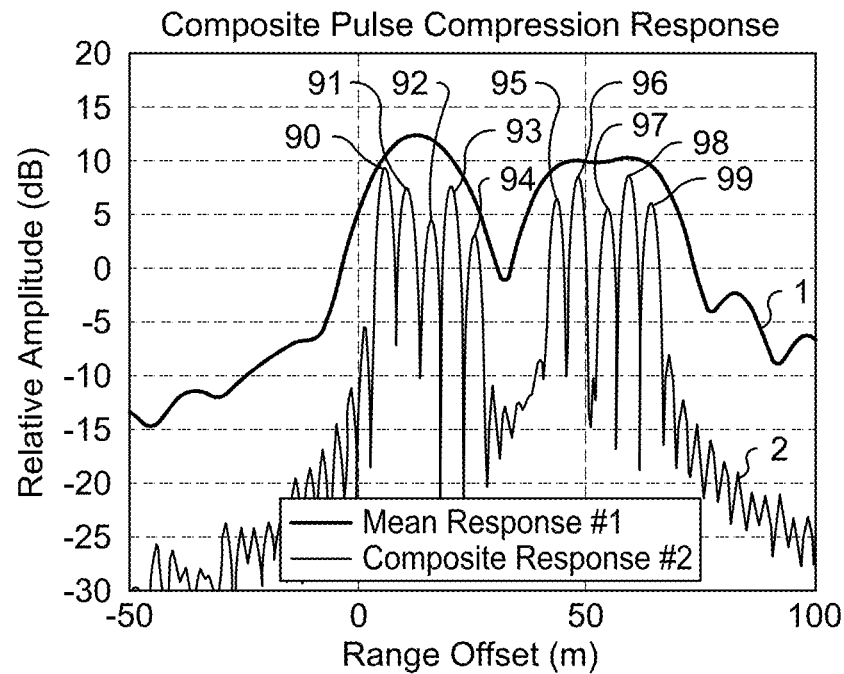
FIG. 11 is a graphical illustration of a comparison between the mean pulse compression response illustrated in FIG. 9 and the composite pulse compression response of FIG. 10.

FIGS. 8 through 16 generally illustrate the improved instantaneous waveform bandwidth mode of operation according to embodiments of the present disclosure. Referring to FIG. 8, in one exemplary embodiment, the antenna front end 22 and its associated exciters 16$_{1-N}$ of radar system 10 are partitioned into five subapertures in order to transmit five distinct RF frequencies simultaneously, each with a bandwidth of 10 MHz. Radar system 10 operates with five distinct LO frequencies 80 to transmit five distinct RF waveforms 82 having frequency centers of 1980, 1990, 2000, 2010 and 2020 MHz corresponding to a middle of an intermediate frequency band. Note that this example demonstrates an LFM waveform modulation; however, this embodiment can be used with any arbitrary waveform modulation. FIG. 9 illustrates processed return signals originating from transmitted waveforms 82, including pulse compression responses calculated from the outputs of receivers utilizing each of the five LO frequencies, as well as a mean or average pulse compression response across the five LO frequencies. According to embodiments of the present disclosure, pulse compression responses associated with each LO frequency are coherently integrated, with a resulting composite response illustrated in FIG. 10. Referring generally to FIG. 11, a comparison of the calculated mean pulse compression response derived from a single LO frequency to the coherently integrated composite response across all LO frequencies is provided. As shown, the enhanced instantaneous bandwidth reflected in the composite reveals ten individual resolved targets 90-99 that were otherwise unresolvable with a single LO frequency.

Figure 12:
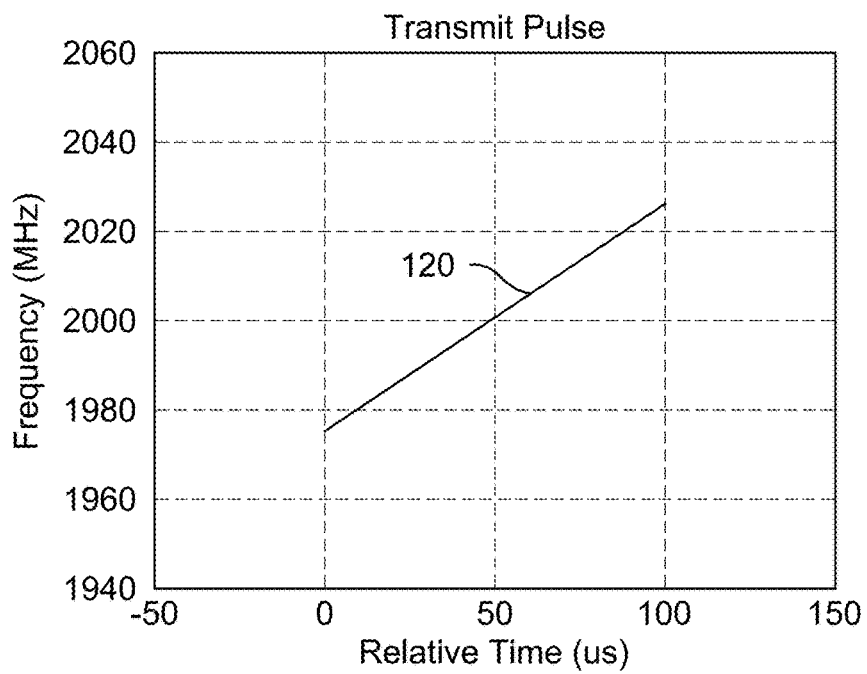
FIG. 12 is a graphical illustration of another exemplary transmitted waveform useful for describing another embodiment of the enhanced instantaneous wideband frequency response mode of operation.
Figure 13:
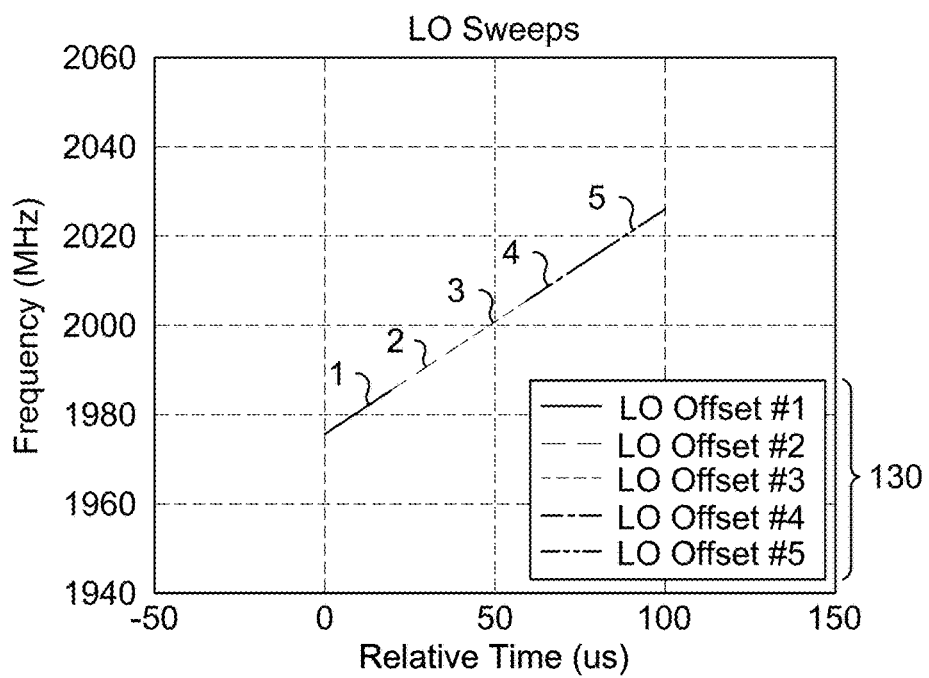
FIG. 13 is a graphical illustration of a plurality of received return waveforms originating from the transmitted waveform of FIG. 12.
Figure 14:
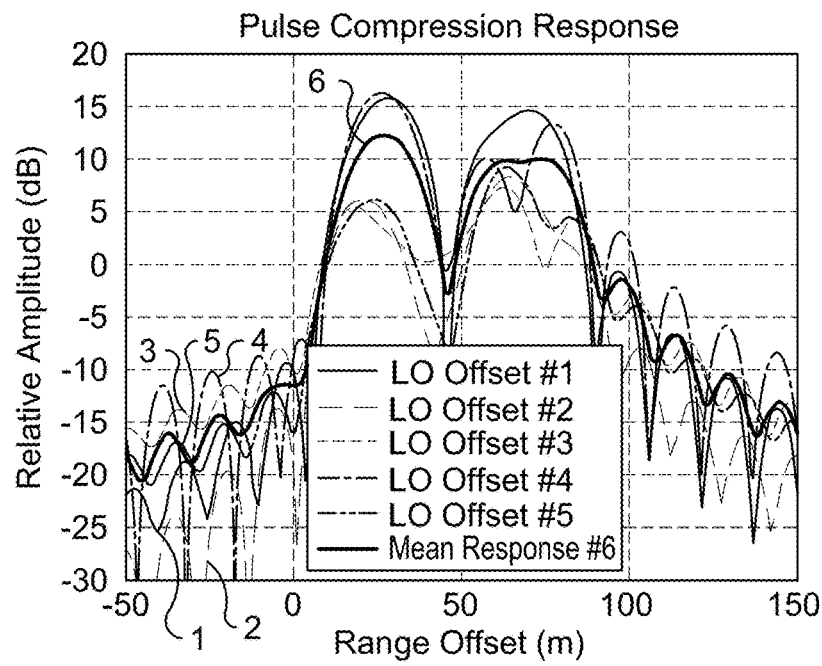
FIG. 14 is a graphical illustration of exemplary pulse compression responses of respective received return signals originating from the transmitted waveform of FIG. 12, as well as a mean pulse compression response.
Figure 15:
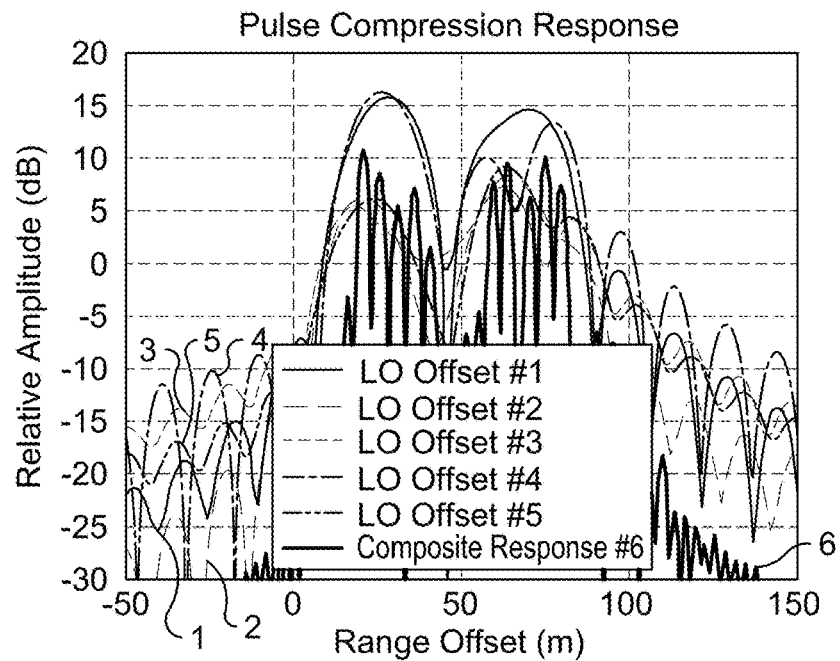
FIG. 15 is a graphical illustration of exemplary pulse compression responses of respective received return signals originating from the transmitted waveform of FIG. 12, as well as a composite pulse compression response.
Figure 16:
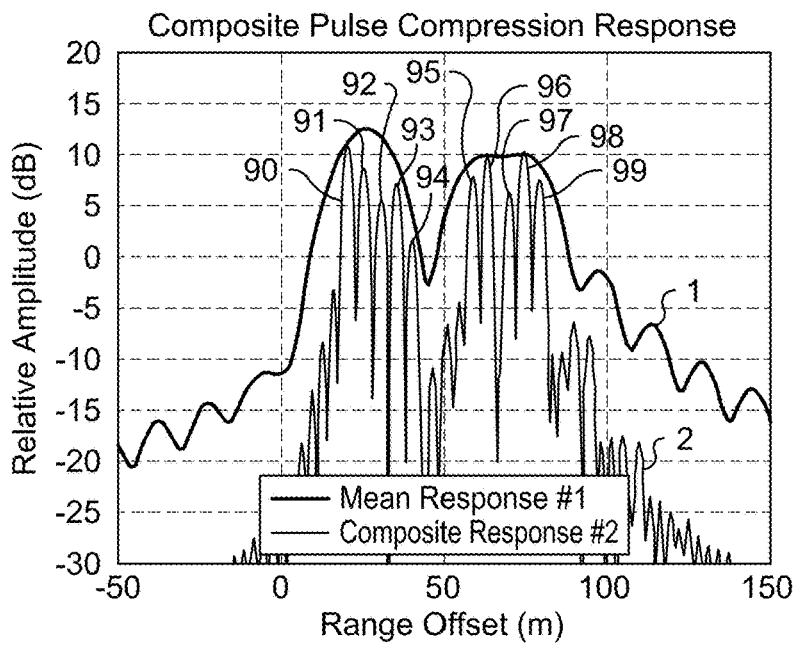
FIG. 16 is a graphical illustration of a comparison between the mean pulse compression response illustrated in FIG. 14 and the composite pulse compression response illustrated in FIG. 15.

In an alternate embodiment to that set forth above with respect to FIGS. 8-11, and referring generally to FIG. 12, radar system 10 may transmit a single full bandwidth waveform 120 across each element in antenna front end 22 and its associated exciters $16_{1-N}$. As illustrated in FIG. 13, a return signal originating therefrom may be frequency multiplexed utilizing the five LO frequencies 130 set forth above. FIG. 14 illustrates the pulse compression responses calculated from the outputs of receivers utilizing each of the five LO frequencies, as well as a mean pulse compression response across the five LO frequencies. According to embodiments of the present disclosure, pulse compression responses associated with each LO frequency are coherently integrated, with a resulting composite response illustrated in FIG. 15. Referring generally to FIG. 16, a comparison of the calculated mean pulse compression response derived from a single LO frequency to the coherently integrated composite response across all LO frequencies is provided. As shown, the enhanced instantaneous bandwidth reflected in the composite reveals the same ten individual resolved targets 90-99 that were otherwise unresolvable with a single LO frequency.

Figure 17:
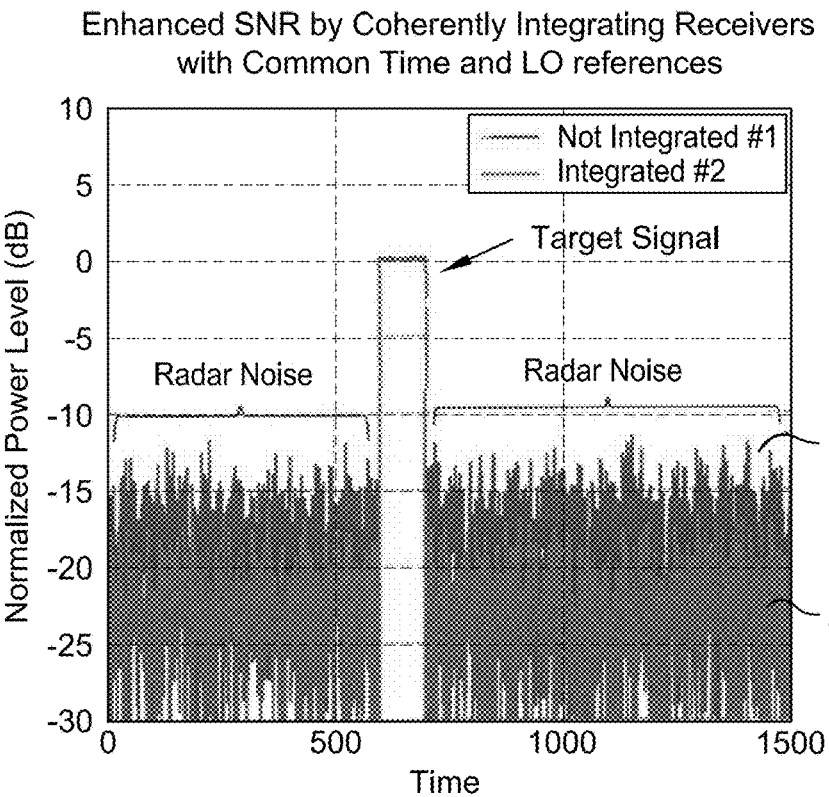
FIG. 17 is a graphical illustration of an enhanced signal-to-noise ratio (SNR) achieved by systems and methods of the present disclosure.

FIG. 17 illustrates an enhanced sensitivity benefit achieved by systems and methods according to embodiments of the present disclosure. This is achieved while simultaneously achieving a factor of N benefit in radar system dynamic range due to the splitting of the return signal across N receivers. As set forth above with respect to FIGS. 2A and 3A, integrating the outputs of N receivers with a common clock reference and common LO frequency results in an increased effective front end noise gain $G_{FE}$ which de-emphasizes the receiver noise figure ($F_{Rx}$) contribution on the overall radar system noise figure $F_{radar}$ as follows (in power units):

$$F_{radar} = F_{FE} + \frac{F_{Rx} - 1}{G_{FE}} \quad \text{Eq. 3}$$

wherein $F_{FE}$ is the RF Front End noise figure. As shown, based on an exemplary system utilizing ten receivers, having an RF front end noise figure of 3 dB, a front end noise gain of 20 dB, individual receiver noise figure of 15 dB, and a receiver bandwidth of 10 MHz, the integrated outputs of the receivers results in a reduction in the power level of system noise. This is provided while simultaneously providing a factor of ten benefit in system dynamic range relative to a radar system with a single receiver.

The embodiments are provided by way of example only, and other embodiments for implementing the methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. The above-described processing components (e.g. mode control processor 20, digital signal processor/beamformer 24, detection processor 26) may be embodied as a single multi-purpose processor, or any other number of discrete processors suitable for performing the described operations without departing from the scope of the present disclosure. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A signal processing system, comprising:
   a plurality of receivers configured to receive a return signal from a transmitted radio frequency (RF) waveform;
   a mode control processor coupled to the plurality of receivers and configured to generate at least one control signal to selectively alter, for a single pulse repetition interval (PRI), at least one characteristic of a signal down conversion process performed by each receiver for the single PRI relative to at least one other receiver of the plurality of receivers; and
   a digital signal processor configured to integrate the outputs of the plurality of receivers for the single PRI, wherein a first subset of the plurality of receivers configures a maximum instantaneous bandwidth for the single PRI by combining, according to a same time, the received return signal individually with each of a first plurality of different waveforms having respective different frequencies.

2. The system of claim 1, wherein the at least one characteristic includes a time at which the signal down conversion process occurs.

3. The system of claim 2, wherein the at least one control signal comprises respective first control signals indicative of a time offset relative to a master clock reference to be supplied to each receiver.

4. The system of claim 3, wherein the at least one characteristic further includes a frequency of a local oscillator signal used in the signal down conversion process.

5. The system of claim 4, wherein the at least one control signal comprises respective second control signals indicative of the frequency of the local oscillator signal to be supplied to each receiver.

6. The system of claim 4, wherein the mode control processor is further configured to:
configure a first receiver of the plurality of receivers to down convert the received return signal using a first local oscillator signal of a first frequency at a first time; and
configure a second receiver of the plurality of receivers to down convert the received return signal using a second local oscillator signal of a second frequency, distinct from the first frequency, at the first time.

7. The system of claim 6, wherein the mode control processor is further configured to:
generate a first control signal, as one of said at least one control signal, indicative of the first time;
generate a second control signal, as one of said at least one control signal, indicative of the first local oscillator signal of the first frequency;
generate a third control signal, as one of said at least one control signal, indicative of the second local oscillator signal of the second frequency;
communicate the first and second control signals to the first receiver; and
communicate the first and third control signals to the second receiver.

8. The system of claim 6, wherein the mode control process is further configured to:
configure a third receiver of the plurality of receivers to down convert the received return signal using a third local oscillator signal of a third frequency at a second time; and
configure a fourth receiver of the plurality of receiver to down convert the received return signal using the third local oscillator signal of the third frequency at a third time, distinct from the second time.

9. The system of claim 8, wherein the mode control processor is further configured to:
generate a first control signal, as one of said at least one control signal, indicative of the second time;
generate a second control signal, as one of said at least one control signal, indicative of the third time;
generate a third control signal, as one of said at least one control signal, indicative of the third local oscillator signal of the third frequency;
communicate the first and third control signals to the third receiver; and
communicate the second and third control signals to the fourth receiver.

10. A signal processing system, comprising:
a plurality of receivers configured to receive a return signal from a transmitted radio frequency (RF) waveform;
one or more computer processors; and
a memory in communication with the one or more computer processors and storing program instructions, the one or more computer processors operative with the program instructions to,
in response to a first control signal to set a maximum instantaneous bandwidth for a single pulse repetition interval (PRI):
configure a first receiver of the plurality of receivers to combine the received return signal with a first waveform of a first frequency at a first time for the single PRI;
configure a second receiver of the plurality of receivers to combine the received return signal with a second waveform of a second frequency different from the first frequency and at the first time for the single PRI; and
in response to a second control signal to set a maximum window range for the single PRI:
configure a third receiver of the plurality of receivers to combine the received return signal with a third waveform at a second time for the single PRI;
configure a fourth receiver of the plurality of receiver to combine the received return signal with a fourth waveform of a same frequency as that used by the third receiver and at a third time distinct from the second time of the third receiver for the single PRI.

11. The system of claim 10, wherein the one or more computer processors is further configured to, in response to the first control signal, generate a first clock control signal indicative of a time offset relative to a master clock reference.

12. The system of claim 11, wherein the one or more computer processors is further configured to, in response to the first control signal, transmit the first clock control signal to each of the first and second receivers.

13. The system of claim 11, wherein the one or more computer processors is further configured to, in response to the first control signal, generate a first local oscillator control signal indicative of the first waveform of the first frequency and a second local oscillator control signal indicative of the second waveform of the second frequency.

14. The system of claim 13, wherein the one or more computer processors is further configured to, in response to the first control signal:
transmit the first local oscillator control signal to the first receiver, and
transmit the second local oscillator control signal to the second receiver.

15. A method of processing received signals in a radar system, comprising:
receiving a return signal via at least one antenna element;
processing the received return signal using a first subset of a plurality of receivers for a single pulse repetition interval (PRI), wherein each receiver of the first subset combines the return signal at a first time with a first local oscillator signal whose frequency is distinct from local oscillator signals utilized by the remainder of the receivers of the first subset; and
processing the received return signal using a second subset of the plurality of receivers for the single PRI, wherein each receiver of the second subset combines the return signal with a second local oscillator signal of a same frequency and at a second time distinct from a time or times of combining the return signal for the remainder of the receivers of the second subset.

16. The method of claim 15, wherein said processing the received return signal with the first subset of the plurality receivers is initiated upon receipt of a first control signal.

17. The method of claim 15, wherein said processing the received return signal with the second subset of the plurality receivers is initiated upon receipt of a second control signal.

18. The system of claim 1, wherein a second subset of receivers of the plurality of receivers configures a maximum window range for the single PRI by combining, at respective different times, the received return signal individually with each of a second plurality of different waveforms having a same frequency.

* * * * *